Patented Aug. 23, 1949

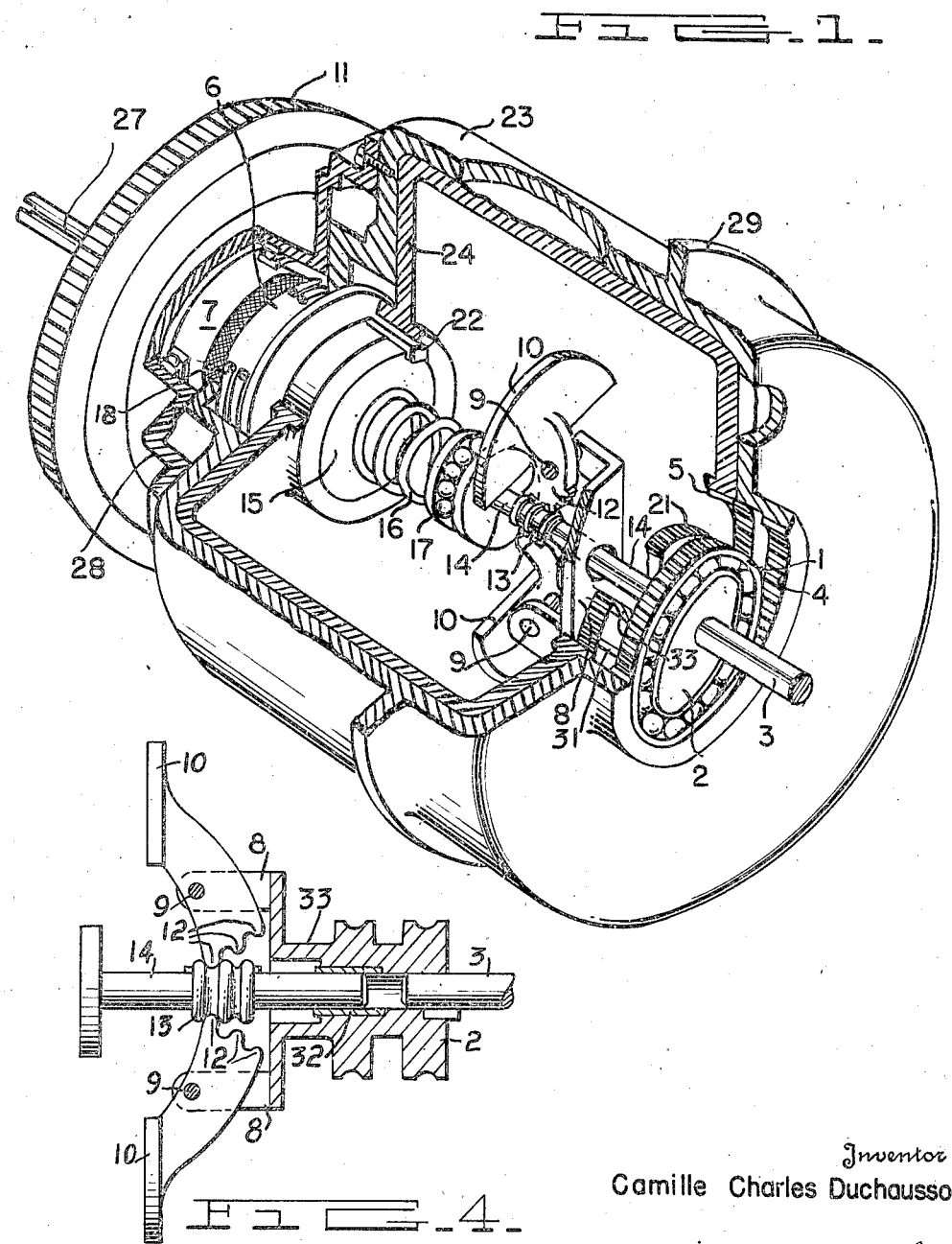

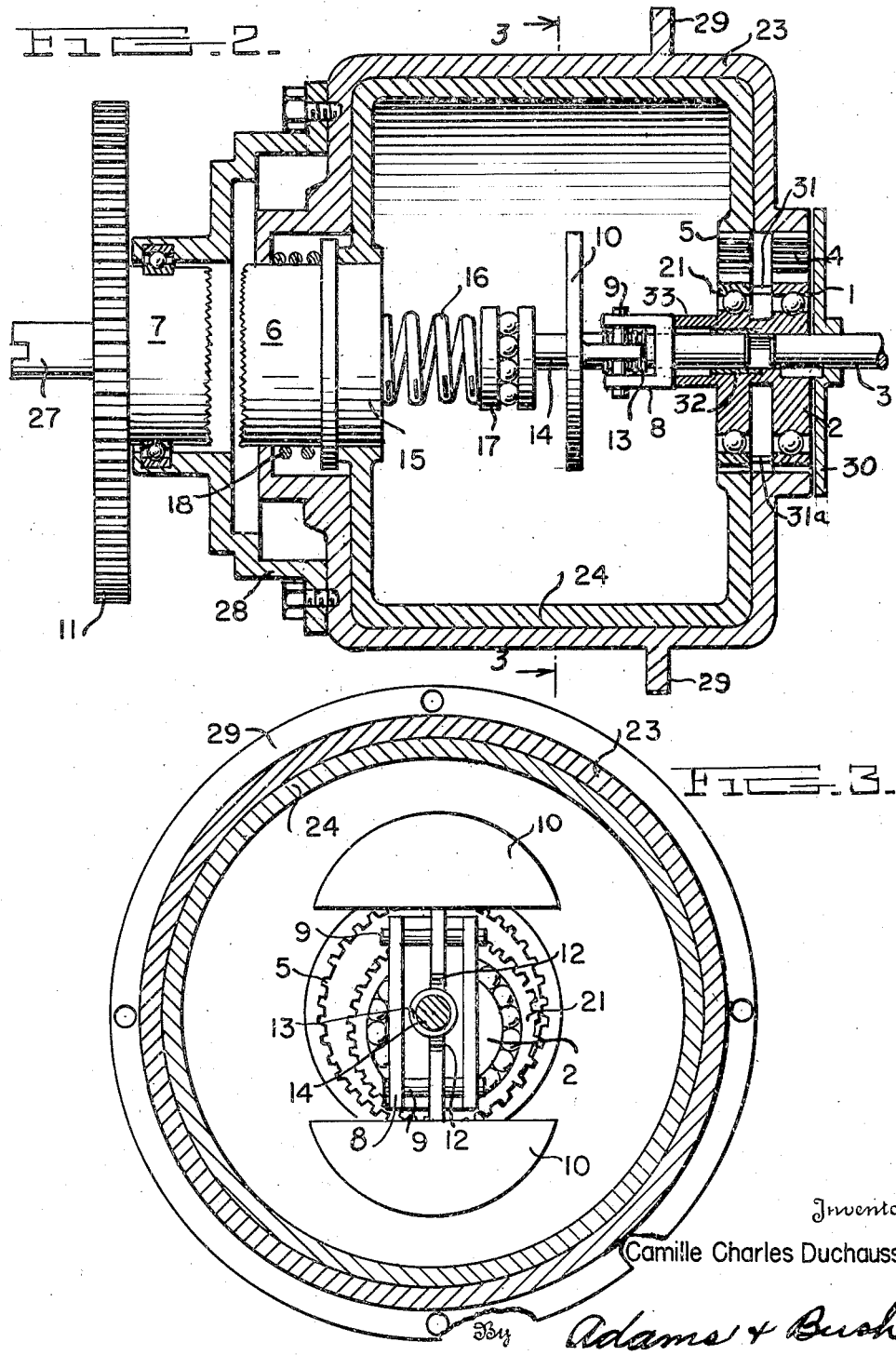

2,479,734

UNITED STATES PATENT OFFICE 2,479,734

AUXILIARY MOTOR CONTROL UNIT

Camille Charles Duchaussoy, Saint-Maur, France, assignor to Compagnie Generale Pour L'Equipment Aeronautique, Societe Anonyme, Paris, France, a corporation of France Application February 24, 1948, Serial No. 10,528
In France April 4, 1944

Section 1, Public Law 690, August 8, 1946
Patent expires April 4, 1964

6 Claims. (Cl. 192—3.6)

The present invention relates to control devices comprising clutches, and more particularly to emergency controls for an auxiliary motor drive of a rotating shaft which is normally driven by a principal motor, the auxiliary motor being thrown in only in case of stoppage of the principal motor.

Such installations are frequent in machines where there are employed an auxiliary electric motor, for example, to start an internal combustion motor, or to cause a change of the pitch of a propeller of a multi-engine airplane in the case in which, following the stopping of an engine or principal motor, which likewise controls its pitch setting, the propeller should be placed in feathered position by the auxiliary motor and brought by the latter to the flying pitch before again bringing into driving operation the engine driving the propeller.

These installations advantageously comprise between the auxiliary electric motor and the drive shaft, an automatic clutch, as well as a speed reducer, to permit the employment of a high-speed electric motor which has light weight.

An object of the present invention is to provide a spur-gear reducer particularly, but not exclusively, applicable to such installations, this reducer being characterized by the fact that it is constituted by a double satellite wheel mounted eccentrically freely rotatably on the shaft, consisting of two external spur gears attached together driven by the auxiliary motor and made eccentric with relation to this shaft and with relation to two coaxial gears with internal teeth, with which the two sets of teeth of the satellite respectively mesh, one of these gears being fixed while the other is keyed on the output shaft to be driven.

Another object of the present invention resides in the centrifugal clutch employed to couple and uncouple the electric motor automatically with the driven shaft, this clutch being characterized by the fact that it is essentially constituted by three separate colinear pieces of shafting, aligned along the same axis, the first fixed to the shaft of the auxiliary motor, and which carries centrifugal wings provided with a toothed sector, the second constituting the intermediate shaft carrying at its end toward the auxiliary motor, a rack meshing with these toothed sectors, and at its opposite end carrying one of the clutch discs, the second clutch disc being engageable with the first and being provided on the third piece connected to the device to be driven.

In the accompanying drawings:

Fig. 1 shows, in perspective, an embodiment of the present invention applied to the emergency control by an electric motor of the blades of a propeller;

Fig. 2 shows a top plan view of the same with parts in section; and

Fig. 3 shows a transverse section of the same, taken on the line 3—3 of Fig. 2.

Fig. 4 shows in front elevation with parts in section, a detail of the centrifugal clutch and the mounting of the intermediate shaft.

The reducer unit of my invention comprises a double satellite consisting of two gear wheels 1 and 21 of the same diameter, and attached together fixedly, as by cross bars 31, 31a, and having toothings of different pitch, which are mounted freely rotatably on a bearing disc 2 which is eccentrically fixedly attached to the shaft 3 of the driving electric motor as by keying. This double satellite 1, 21, meshes respectively with two gears with internal teeth placed concentrically around the axis of shaft 3, one of these gears 4 cooperating with the wheel 1, being an integral part of the base member of the reducer unit and casing 23, while the second gear with internal teeth 5, cooperating with the wheel 21, forms part of a cylindrical member 24 which drives one of the plates 6 of a plate clutch 6—7, connecting the auxiliary electric motor to the shaft or members to be driven. Gears 4 and 5 have substantially the same tooth pitch.

The double satellite 1, 21, may be only slightly eccentric with relation to the internally toothed gear 4 which is fixed to the casing 23, and the internally toothed gear 5, which is rotatable, with which the double satellite meshes. In fact it is possible to cause meshing of a wheel with outside teeth in a wheel with inside teeth which has a diameter which is only slightly greater, on condition of properly choosing the pressure angle as well as the diameters of the contouring of the teeth; it is desirable to adopt a minimum spacing of six teeth.

Because of this fact, a very large number of teeth are in engagement, and for a given force to be transmitted, the modulus of the teeth can be chosen to be very small, which permits of obtaining a reducer unit of very small dimensions.

Furthermore, the slight degree of eccentricity permits causing the eccentric shaft to rotate at extremely high speed, since the rolling movements of the double satellite are only slightly subjected to the centrifugal force; furthermore, as in all hypocycloid gears, a part of this centrifugal force will be balanced by the tooth reaction.

Since the auxiliary motor shaft 3 rotates at high speed, the driving motor can be small and light. The ratio of the reducer constituted by the wheels 1, 21, 4, 5, may have values within very wide limits.

The centrifugal clutch utilized to couple the reducer unit to the shaft or member to be driven, is constituted by a fork member 8, fixed to bearing disc 2 by connecting annular portion 33; each of the two branches of this fork member 8, carrying a pivot 9 on which is pivoted a wing or flyweight 10. The two pivots 9 are placed at an equal distance from the motor axis, on the opposite sides of the latter, in a plane perpendicular to this axis, so that the wings or flyweights 10, positioned near this axis when in a rest position, are raised under the action of centrifugal force up to the intended position, when the motor has attained the determined speed at which it should be thrown in by engagement of its clutch. For the purpose of transmitting this movement of the wings or flyweights 10 to the clutch-plate 6, in order to displace clutch-plate 6 axially to put it in engagement with the other clutch-plate 7, which is integral with the shaft or member 11 to be driven by the auxiliary motor, the wings or flyweights 10 each carry a toothed sector 12, which meshes with a rack 13 fixed on the shaft 14, 15, carrying the clutch-plate 6. This latter shaft 14, 15, is made in two parts or sections, 14, 15, connected by the helical spring 16 and by a thrust-block 17. The shaft section 14 carries the rack 13, one end of the spring 16 being fixed to the block, while the clutch-plate 6 is fixed on the shaft section 15. One end of shaft 14 passes freely through annular sleeve portion 33, and has a sliding fit inside a sleeve bearing 32 provided in an axial bore in bearing disc 2. This latter section 15, is set into rotation by the gear 5 of the reducer unit through its cylindrical member 24, by means of a pin 22, without this pin preventing the axial displacement of the clutch-plate 6 under the pushing of the rack 13, or under the action of the spring 18, tending to separate the two plates 6, 7, of the clutch.

The operation of the described assembly is as follows: The auxiliary motor, being declutched from the driven member 11 which it is to drive, is started up and engages only the one clutch plate 6, and its speed of rotation is reduced by the reducer unit 1, 4, 5. When the fork member 8, fixedly mounted on the motor shaft 3, has attained a predetermined operating speed, the wings or flyweights 10 will have arrived in the position shown in the drawing and their toothed sectors 12 will have displaced the rack 13 sufficiently axially toward the left, so that the pushing of the shaft section 14 of the intermediate shaft 14, 15, which push is transmitted through the spring 16, compresses the spring 18 and brings into engagement the two plates 6, 7, of the clutch.

The calibrated spring 16 is designed in a manner to balance the axial component of the tangential force due to the motor torque. If for any reason, during the driving by the motor of the driving shaft 3, the driven member 11 is subjected to an external torque, under the action of external forces, and tends to assume a speed which is greater than the speed applied to it by the motor shaft 3, the helical spring 16 permits the grips of the clutch-plates 6, 7, to jump apart a little, and consequently the clutch to slip.

In order to control with the described device the orientation of the blades of a propeller, it is sufficient to cause to engage with the driven wheel 11, the one of the clutch discs normally controlled by the main propeller engine of the aircraft to change the pitch of the propeller.

In order to serve as a starter for a combustion motor, it is sufficient to key the clutch plate 7 on the crank shaft of the combustion motor or any other part in driven engagement with the latter.

It will be apparent to those skilled in the art that my invention is susceptible of modification to adapt the same to particular applications and conditions, and all such modifications which are within the scope of the appended claims, I consider to be comprehended within the spirit of my invention.

I claim:

1. In an auxiliary speed reducing motor control unit, a driving shaft, an intermediate shaft, a driven shaft, a casing, said shafts being mounted coaxially separately in said casing, and said driving and driven shafts projecting through said casing, said casing being provided with a circular aperture having internal spur teeth concentric with said driving shaft, a circular eccentric bearing member fixedly carried by said driving shaft, a gyratory member comprising a pair of external spur gears of the same diameter having different pitches of their teeth and being fixedly attached together and rotatably mounted on said eccentric bearing member, a hollow cylindrical member rotatably mounted within said casing contiguous thereto and having a circular aperture surrounding said driving shaft and of the same diameter and in register with said aperture in said casing and further being provided with internal spur teeth concentric with said drive shaft, said external spur gears of said gyratory member being of smaller diameter than said apertures in said casing and said cylindrical member, and respectively meshing with said internal spur teeth of said apertures, said intermediate shaft comprising a rack adapted to apply axial displacing pressure thereto, centrifugal displaceable means carried by said driving shaft and adapted under centrifugal actuation to apply axial thrust to said rack, said intermediate shaft being axially slidably keyed to said cylindrical member, and a plate clutch having its plates respectively connected to said intermediate shaft and to said driven shaft, whereby upon attainment by said driving shaft of a relatively high desired speed, said driven shaft is driven at a desired relatively low speed.

2. A control unit according to claim 1, said centrifugal means comprising a fork member terminally carried by said driving shaft, and wing members pivotally mounted on said fork member for pivoting about an axis perpendicular to the axis of said driving shaft and comprising a toothed sector engaging said rack.

3. A control unit according to claim 1, at least six of said external spur teeth of each gear being in engagement with said internal spur teeth.

4. A control unit according to claim 1, said apertures of said casing and said cylindrical member having substantially the same pitch of their said internal spur teeth.

5. A control unit according to claim 1, said intermediate shaft having a first section carrying said rack and a second section coaxial with and separate and spaced from said first section and axially slidably keyed to said cylindrical member, and carrying a plate of said clutch, and axially deformable resilient means interposed between the adjacent ends of said first and second sections of said intermediate shaft.

6. A control unit according to claim 1, said intermediate shaft having a first section carrying said rack and a second section coaxial with and separate and spaced from said first section and axially slidably keyed to said cylindrical member, and carrying a plate of said clutch, and axially deformable resilient means interposed between the adjacent ends of said first and second sections of said intermediate shaft, and a thrust block carried at the end of one said sections of said intermediate shaft, and said resilient means being fixed to said thrust block.

CAMILLE CHARLES DUCHAUSSOY.

No references cited.